May 10, 1927.

J. M. SEYMOUR

HEAT TRANSFER APPARATUS

Filed July 16, 1926

INVENTOR
James M. Seymour.
BY
Frautzel and Richards
ATTORNEYS

May 10, 1927.
J. M. SEYMOUR
1,627,713
HEAT TRANSFER APPARATUS
Filed July 16, 1926     2 Sheets-Sheet 2
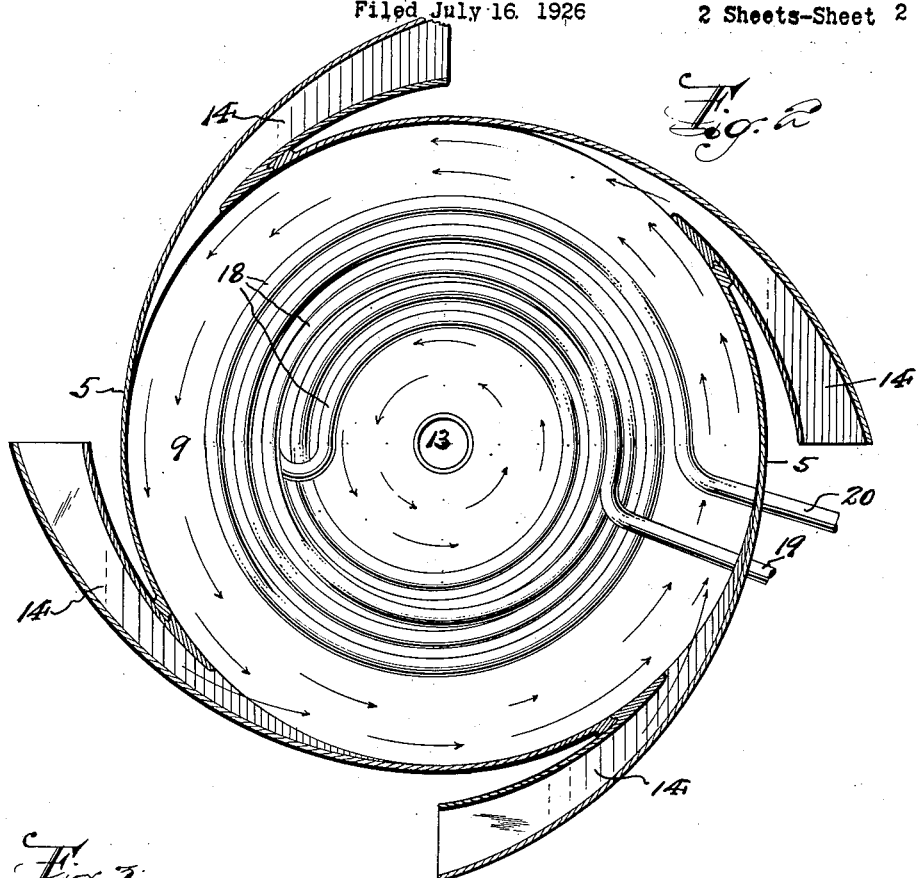
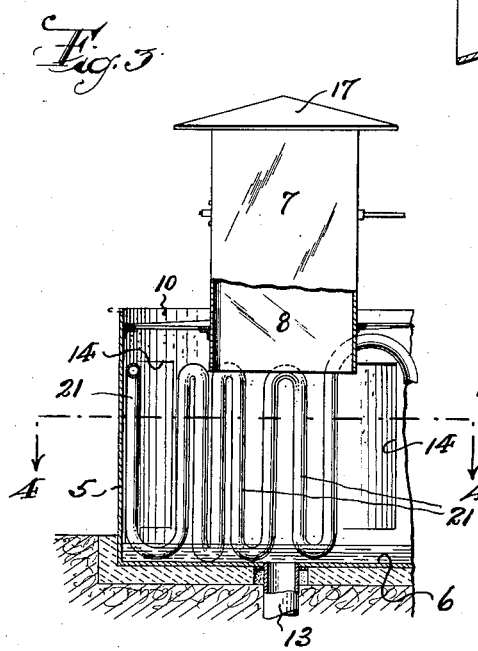
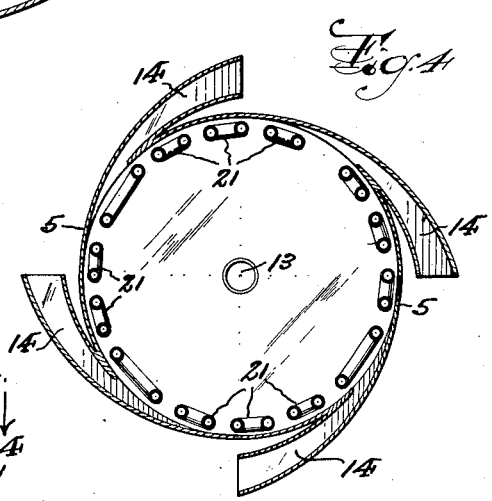
INVENTOR
James M. Seymour.
BY
Frautzel and Richards
ATTORNEYS Patented May 10, 1927.

1,627,713

UNITED STATES PATENT OFFICE.

JAMES M. SEYMOUR, OF NEWARK, NEW JERSEY.

HEAT-TRANSFER APPARATUS.

Application filed July 16, 1926. Serial No. 122,799.

This invention has reference to a novel construction of apparatus for extracting heat from refrigerating fluids, such, for example, as those employed in refrigerating systems, ice manufacturing plants, etc.

This invention has for its principal object to provide a very simple, compact and efficient cooling apparatus operative to transfer heat from a fluid medium circulated through a system of cooling pipes by bringing into contact with the latter both water and moving air in such novel manner that the cooling effects of water evaporation from the pipe surfaces is greatly increased and produced more rapidly by the frictional contact with the water on the cooling pipes of the moving air streams; the cooling effect thus obtained being much more efficient than normal evaporation in comparatively still air, since the more or less violent contact of the moving air with the water films on the cooling pipes tends to produce super-saturation of the air and consequent increased capacity for absorption of heat units.

This invention has for a further object to provide an apparatus for the purposes above mentioned which is of comparatively small bulk adapted to occupy but little space, and yet which functions by such novel mode of operation that the desired heat transfer or cooling effect may be easily attained within the control of the user regardless of varying atmospheric conditions and even in spite of ordinarily unfavorable atmospheric conditions.

Other objects of this invention, not at this time more particularly enumerated, will be clearly understood from the following detailed description of the same.

With the various objects of this invention in view, the same consists in the novel construction and arrangement of heat transfer apparatus hereinafter set forth; and the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 2 is a horizontal section through the same, taken on line 2—2 in said Figure 1;

Figure 3 is a fragmentary central vertical section of another somewhat modified form of my novel construction of heat transfer apparatus according to this invention; and Figure 4 is a horizontal section through the same, taken on line 4—4 in said Figure 3.

Similar characters of reference are employed in all of the hereinabove described views, to indicate corresponding parts.

Figure 1:
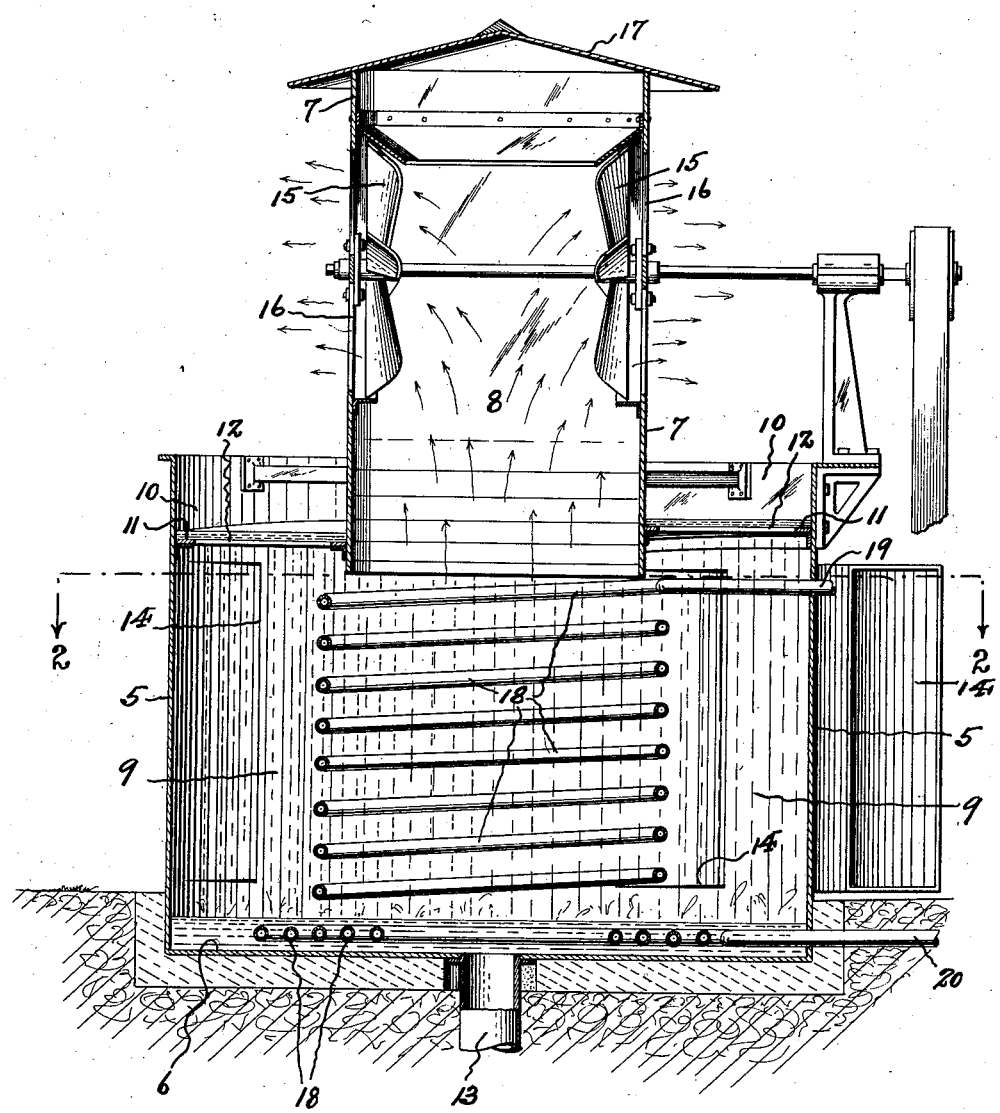
Figure 1 is a central vertical section of one arrangement and construction of heat transfer apparatus made according to and embodying the principles of this invention.

Referring now to said drawings, the reference character 5 indicates a substantially cylindrical tower housing which may be built of wood, sheet metal, masonry or any other material found convenient or desirable. Said housing is provided with a closed bottom end 6. Axially alined with and communicating with the upper end portion of the interior of said housing 5 is a vertically and upwardly extending discharge stack 7 adapted to provide an axial discharge passage 8 leading from the central interior portion of said housing. Preferably said stack 7 is of considerably reduced diameter relative to the diameter of the housing. The interior of said housing contiguous to its side walls provides an annular chamber 9 open to the inner central space beneath said stack 7.

Said housing 5 is suitably constructed at its upper end and above said annular chamber 9 to provide a water receiving and distributing trough 10. This trough 10 surrounds the upwardly projecting stack 7, and may be open to the atmosphere. If desired the floor or bottom 11 of said trough may be given an inclination or slope in the direction of its annular or circumferential extent as it turns about the stack 7, thereby establishing a decending grade, so that water delivered into said trough at its high level will flow by gravity around the entire length of the same. The said floor or bottom 11 of the trough is provided throughout its length with a plurality of discharge openings 12, through which the water delivered thereinto may escape in streams, so as to enter the annular chamber 9 of said housing and shower downwardly therethrough for collection in the bottom of the housing. Any suitable means (not shown) may be employed to deliver water into said trough 10, and any suitable form and arrangement of discharge conduit 13 may be employed to discharge the collected water from the bottom portion of said housing.

Said housing is provided in its circumferential side walls with one or more tangential air delivery intakes 14 open at their outer ends to the atmosphere, and arranged to deliver air from the atmosphere tangentially into the annular chamber 9 of the housing for gyration around the latter and final discharge upwardly through the stack 7. In order to assure a relatively rapid delivery gyratory circulation and final discharge of atmospheric air into, through and from the housing interior, I may provide suitably mounted and driven air exhaust fans 15 in connection with openings 16 of said discharge stack 7, the operation of which forcibly sucks the air through said tangential air intakes 14 to impart the desired gyratory movement thereto, and then discharges the same axially from the central portion of the housing through the stack 7 and its openings 16. In the form of construction illustrated in the drawings, the exhaust or suction fans 15, and the openings 16 in which they are operative, are disposed in the side walls of said stack 7, in which case the upper end of said stack 7 is closed by an end wall 17 as shown; it will be understood, however, that air suction or exhaust means may be axially related to said stack 7 if desired, or I may employ air propulsion fans in association with the tangential air intake openings 14, in a manner similar to that shown in my prior United States Letters Patent No. 1,582,550, dated April 27th, 1926 for cooling tower, of which the present invention is an outgrowth, whereby the general principles involved in my aforesaid cooling tower invention are extended and specifically applied for the purposes of cooling refrigerating or other fluids operative in a circulatory system.

Arranged within the annular chamber 9, so as to be located in the path of the water showering down therethrough from the trough 10 is an annular or helical coil of cooling pipe 18 extending from the upper portion of the housing interior downward to the lower portion thereof, and in one arrangement, as shown in Figures 1 and 2, adjacent to the axial discharge portion of the housing interior. The intake end 19 of said cooling pipe leads e. g. from a circulatory refrigerating system utilizing a fluid refrigerant such as ammonia, while the outgoing end 20 of said cooling pipe leads back to said circulatory refrigerating system. The fluid refrigerant in passing through the circulatory refrigerating system absorbs heat which must be discharged therefrom before the refrigerant is returned for recirculation through said system; it is therefore the function of the apparatus above described to effect this desired transfer of heat from the refrigerant to properly cool the same for recirculation. In carrying out such function my said novel apparatus operates as follows:—

The helices of said cooling pipe coil 18 are separated sufficiently to provide air passages therebetween. As the water delivered from the trough 10 showers downwardly through the annular chamber 9 of the housing interior, the cooling pipe coil 18, which lies in the path of such descending water shower, is filmed over by the water. While the cooling pipe coil 18 is thus coated with water films, the air impulsion means produces the inward movement of atmospheric air into the annular chamber 9 of the housing, and owing to the tangential relation of the air intake openings 14, the entering air is caused to swirl or gyrate around said annular chamber, and by such movement is caused to frictionally sweep along and across the water filmed exterior surfaces of the cooling pipe coil. This movement of the air not only serves to cool the water itself and produce a comparatively low interior temperature within the tower housing, according to the principles and mode of operation fully described in my heretofore mentioned prior cooling tower patent, but by reason of frictional sweeping contact with the water filmed cooling pipe surfaces produces a very active and more rapid evaporative effect upon said water films tending to super-saturate the moving air streams and thereby greatly increase the joint capacity of the water and air to absorb and carry off heat units thus transferred thereto from the refrigerating fluid passing through the cooling pipe. Since the super-saturated air is constantly displaced by the incoming following air, and thus moved toward the center of the housing interior from whence it is quickly discharged through the stack 7, it follows that the operative effects of continuous air movement and water supply relative to the surfaces of the cooling pipe assures a continuous cooling process which very rapidly and efficiently transfers and removes the heat units from the refrigerating fluid passing through the said cooling pipe, so that by the time it passes out from the outgoing end 20 of the cooling pipe coil, its temperature is sufficiently reduced for return to the circulatory refrigerating system with which it is employed.

As will be noted from an inspection of Figures 1 and 2 of the drawings, the lower end of the cooling pipe coil 18 may be so formed and arranged as to be submerged in the outflowing body of cooled water which is continuously collecting and being discharged from the bottom of the tower housing interior. Since this water is considerably reduced in temperature, owing to the cooling effects exercised thereon by the gyrating air streams through which it has passed (which effects are obtained in the manner fully explained in my aforesaid United States Letters Patent No. 1,582,550, of April 27th, 1926), the same serves to further absorb heat from the refrigerating fluid, ere the latter is discharged for return to the refrigerating system.

Referring now to Figures 3 and 4 of the accompanying drawings, I have shown a modified arrangement, construction and disposition of the refrigerant conveying cooling pipe, which is within the general scope and principles of the present invention. In this modification, the cooling pipe comprises a series of coil sections 21, connected in series, and arranged against the inner surfaces of the housing wall between the tangential air intake openings 14. It will be apparent that, as thus positioned, the cooling pipe will be subject to both contact with the down showering water as well as with the incoming gyrating air streams, and that consequently the cooling effects will be obtained in substantially the same manner as already hereinabove described. It will be quite evident, that arrangements of the cooling pipe other than those above specified may also be possible, hence I do not limit myself necessarily to the particular arrangement so described.

In fact in the accompanying drawings, especially in Figures 1 and 2, the present invention has been shown merely in preferred form and by way of example, but obviously many alterations and variations may be made therein which will still be comprised within its spirit. Generally speaking, it is to be understood the invention is not limited to any specific form or adaptation except in so far as such limitations are specified in the appended claims.

Having thus described my present invention, I claim:—

1. In an apparatus of the kind described, a vertical substantially cylindrical housing having a central air discharge means communicating with its upper end, means for delivering air tangentially into said housing for gyration about the vertical axis thereof and final ejection through said air discharge means, means for showering water downwardly through the gyrating body of air circulated through said housing, and a cooling pipe system through which may be circulated a medium to be relieved of heat, said cooling pipe system being located in the path of the water shower and so as to be subject to the frictional contact of said gyrating body of air.

2. In an apparatus of the kind described, a vertical substantially cylindrical housing having a central air discharge means communicating with its upper end, means for delivering air tangentially into said housing for gyration about the vertical axis thereof and final ejection through said air discharge means, means for showering water downwardly through the gyrating body of air circulated through said housing, a cooling pipe system through which may be circulated a medium to be relieved of heat, said cooling pipe system being located in the path of the water shower and so as to be subject to the frictional contact of said gyrating body of air, and mechanical means for forcibly inducing the gyrating circulation of air through and axial discharge thereof from said housing.

3. In an apparatus of the kind described, a vertical substantially cylindrical housing having a central air discharge means communicating with its upper end, means for forcing a plurality of streams of atmospheric air tangentially into said housing for rotative movement therein, said tangential air streams being projected along the side walls of said housing until each stream reaches the stream in advance thereof which will crowd the former toward the center of the housing for ultimate ejection through said air discharge means, means for showering water downwardly through the thus circulated air streams, and a cooling pipe coil substantially concentric to the vertical axis of said housing through which may be circulated a medium to be relieved of heat, said cooling pipe coil being located in the path of the water shower and so as to be subject to the frictional contact of the circulated air streams.

4. In an apparatus of the kind described, a vertical substantially cylindrical housing having a central air discharge means communicating with its upper end, means for forcing a plurality of streams of atmospheric air tangentially into said housing for rotative movement therein, said tangential air streams being projected along the side walls of said housing until each stream reaches the stream in advance thereof which will crowd the former toward the center of the housing for ultimate ejection through said air discharge means, means for showering water downwardly through the thus circulated air streams, a cooling pipe coil substantially concentric to the vertical axis of said housing through which may be circulated a medium to be relieved of heat, said cooling pipe coil being located in the path of the water shower and so as to be subject to the frictional contact of the circulated air streams, and mechanical means for forcibly inducing the movement of said air streams as aforesaid.

In testimony, that I claim the invention set forth above I have hereunto set my hand this 13th day of July, 1926.

JAMES M. SEYMOUR.